US008762129B2

(12) United States Patent
Huang et al.

(10) Patent No.: US 8,762,129 B2
(45) Date of Patent: Jun. 24, 2014

(54) TECHNIQUES FOR INPUT OF A MULTI-CHARACTER COMPOUND CONSONANT OR VOWEL AND TRANSLITERATION TO ANOTHER LANGUAGE USING A TOUCH COMPUTING DEVICE

(75) Inventors: Hao Huang, Beijing (CN); Song Fu, Beijing (CN); Wei Sun, Beijing (CN); Hanping Feng, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/350,901

(22) Filed: Jan. 16, 2012

(65) Prior Publication Data

US 2013/0151234 A1    Jun. 13, 2013

Related U.S. Application Data

(63) Continuation of application No. PCT/CN2011/083836, filed on Dec. 12, 2011.

(51) Int. Cl.
*G06F 17/20* (2006.01)
*G06F 3/02* (2006.01)

(52) U.S. Cl.
USPC ............................................. 704/8; 345/168

(58) Field of Classification Search
None
See application file for complete search history.

(56) References Cited

U.S. PATENT DOCUMENTS

| 5,574,482 | A | | 11/1996 | Niemeier | |
|---|---|---|---|---|---|
| 5,987,375 | A | * | 11/1999 | Tamai | 701/400 |
| 7,088,340 | B2 | * | 8/2006 | Kato | 345/168 |
| 7,098,896 | B2 | | 8/2006 | Kushler et al. | |
| 2009/0066653 | A1 | | 3/2009 | Wang | |
| 2009/0167706 | A1 | | 7/2009 | Tan et al. | |
| 2009/0225041 | A1 | | 9/2009 | Kida et al. | |

FOREIGN PATENT DOCUMENTS

| CN | 101387915 A | | 3/2009 |
|---|---|---|---|
| CN | 101825954 | * | 9/2010 |
| CN | 101825954 A | | 9/2010 |
| EP | 1 953 623 A1 | * | 8/2008 |
| EP | 1953623 A1 | | 8/2008 |
| WO | 2005064804 A1 | | 7/2005 |
| WO | 2009044997 A1 | | 4/2009 |
| WO | 2010105440 A1 | | 9/2010 |

OTHER PUBLICATIONS

Chen, L., "Aeviou makes typing Chinese so simple even a caveman could do it . . . ," www.techrice.com/2011/01/24/aeviou-makes-typing-chinese-so-simple-even-a-caveman-could-do-it . . . , Jan. 24, 2011, 4 pages.
Aeviou: A Chinese Input Method with Promise, www.sinosplice.com/life/archives/2011/01/25/aeviou-a-chinese-input-method-with-promise, Jan. 25, 2011, 4 pages.
PCT International Search Report and Written Opinion dated Mar. 15, 2012 for Int'l. Appln. No. PCT/CN2011/083836, 7 pages.

* cited by examiner

*Primary Examiner* — Angela A Armstrong
(74) *Attorney, Agent, or Firm* — Remarck Law Group PLC

(57) ABSTRACT

A technique is presented for fast input of multi-character compound consonants and vowels on a touch computing device. The technique provides for fast input of multi-character compound consonants and vowels by enabling a user to touch an initial character on a first layout of characters, then slide his/her finger in different directions and/or different distances according to a second layout of characters. The second layout of characters can be based on the first touched character and therefore can have a limited set of characters, e.g., fewer characters in comparison to the first layout of characters. A syllable formed after input of both a consonant and a vowel, represented as one character set, e.g., in the Roman alphabet, can then be transliterated into another language, e.g., Chinese.

20 Claims, 8 Drawing Sheets

TECHNIQUES FOR INPUT OF A MULTI-CHARACTER COMPOUND CONSONANT OR VOWEL AND TRANSLITERATION TO ANOTHER LANGUAGE USING A TOUCH COMPUTING DEVICE

CROSS-REFERENCE TO RELATED APPLICATION

This application is a continuation of International Application No. PCT/CN2011/083836 filed on Dec. 12, 2011. The entire disclosure of the above application is incorporated herein by reference.

FIELD

The present disclosure relates to touch computing devices and, more particularly, to techniques for input of multi-character compound consonant or vowel and transliteration to another language using a touch computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

"Touch computing devices" include computing devices that receive tactile input from a user. For example, touch computing devices may include mobile phones, tablet computers, portable media players, electronic readers, and the like. Typically, the user may input information to a touch computing device via a touchpad or touch screen (hereinafter referred to as a "touch display"). For example, the touch display may be a capacitive sensing display. The touch display may both display information to the user and receive input from the user. The user may typically input information to the touch computing device by typing using a provided layout of characters. For example, the provided layout of characters may be a form of a standard QWERTY keyboard.

SUMMARY

A computer-implemented technique is presented. The technique includes providing, via a touch display of a touch computing device, a first layout of English characters. The technique also includes receiving, via the touch display of the touch computing device, spot input from a user of the touch computing device, the spot input indicating selection of a vowel from the first layout of English characters. The technique also includes providing, via the touch display of the touch computing device, a second layout of English characters based on the spot input, the second layout of English characters being centered about the selected vowel and including a plurality of characters based on and including the selected vowel, the second layout of English characters being different than the first layout of English characters. The technique also includes receiving, via the touch display of the touch computing device, slide input from the user from the selected vowel to a selected character of the second layout of English characters. The technique also includes determining, at the touch computing device, a string of English characters based on the selected vowel, the selected character, and the second layout of English characters, the string of English characters selectively including one or more other English characters of the second layout of English characters along a path of the slide input, the string of English characters representing a vowel of a Chinese character. The technique also includes generating, at the touch computing device, a Chinese character based on the string of characters. The technique further includes displaying, via the touch display of the touch computing device, the Chinese character.

Another computer-implemented technique is also presented. The technique includes providing, via a touch display of a touch computing device, a first layout of characters in a first language. The technique also includes receiving, via the touch display of the touch computing device, spot input from a user, the spot input indicating a selection of a first character from the first layout of characters. The technique also includes providing, via the touch display of the touch computing device, a second layout of characters in the first language, the second layout of characters being based on the selected first character, the second layout of characters being different than the first layout of characters. The technique also includes receiving, via the touch display of the touch computing device, slide input from the user from the selected first character to a selected second character from the second layout of characters. The technique also includes determining, at the touch computing device, a string of characters based on the selected first and second characters and the second layout of characters, the string of characters representing a syllable in a second language, the second language being different than the first language. The technique further includes displaying, via the touch display of the touch computing device, the string of characters.

A system is also presented. The system includes a user interface module configured to provide, via a touch display of a touch computing device, a first layout of characters in a first language. The user interface module is further configured to provide, via the touch display of the touch computing device, a second layout of characters in the first language, the second layout of characters being based on a selected first character, the second layout of characters being different than the first layout of characters. The user interface module is further configured to receive, via the touch display of the touch computing device, spot input from a user, the spot input indicating the selected first character, the selected first character being from the first layout of characters. The user interface module is further configured to receive, via the touch display of the touch computing device, slide input from the user from the selected first character to a selected second character from the second layout of characters. The user interface module is further configured to determine, at the touch computing device, a string of characters based on the selected first and second characters and the second layout of characters, the string of characters representing a syllable in a second language, the second language being different than the first language. The user interface module is further configured to display, via the touch display of the touch computing device, the string of characters.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
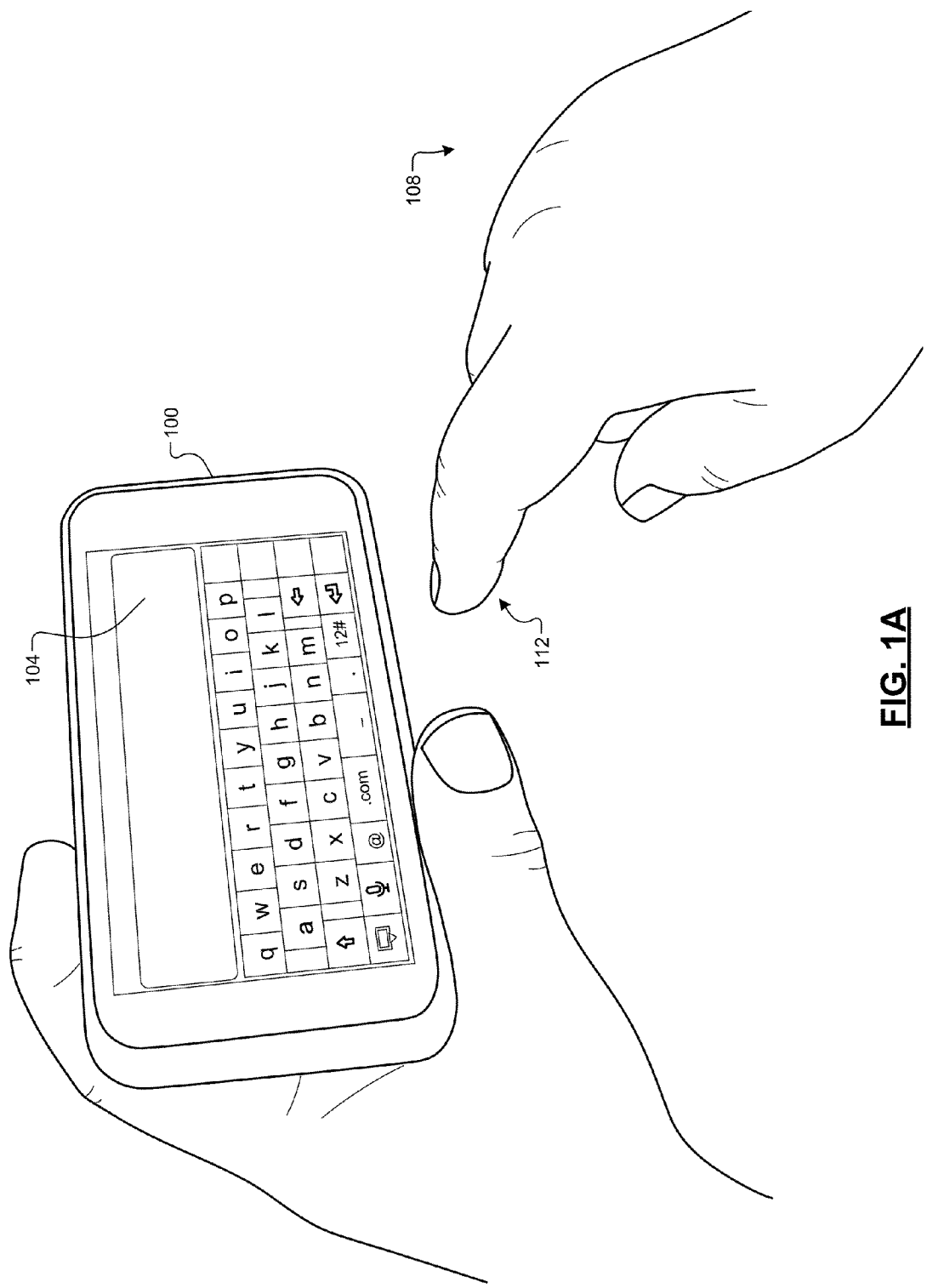
FIG. 1A illustrates an example of a touch computing device according to some implementations of the present disclosure.

Referring now to FIG. 1A, an example of a touch computing device 100 is shown. The touch computing device 100 may be a mobile phone, a tablet computer, or the like. The touch computing device 100 generally includes a touch display 104. The touch display 104 can displays information and/or receive input from a user 108. For example only, the touch display 104 may be a capacitive sensing display. As shown, the user 108 may typically input information to the touch computing device 100 via the touch display 104 using one or more fingers 112. The user 108 may also use other objects such as a stylus, a pen, or the like.

Figure 1B:
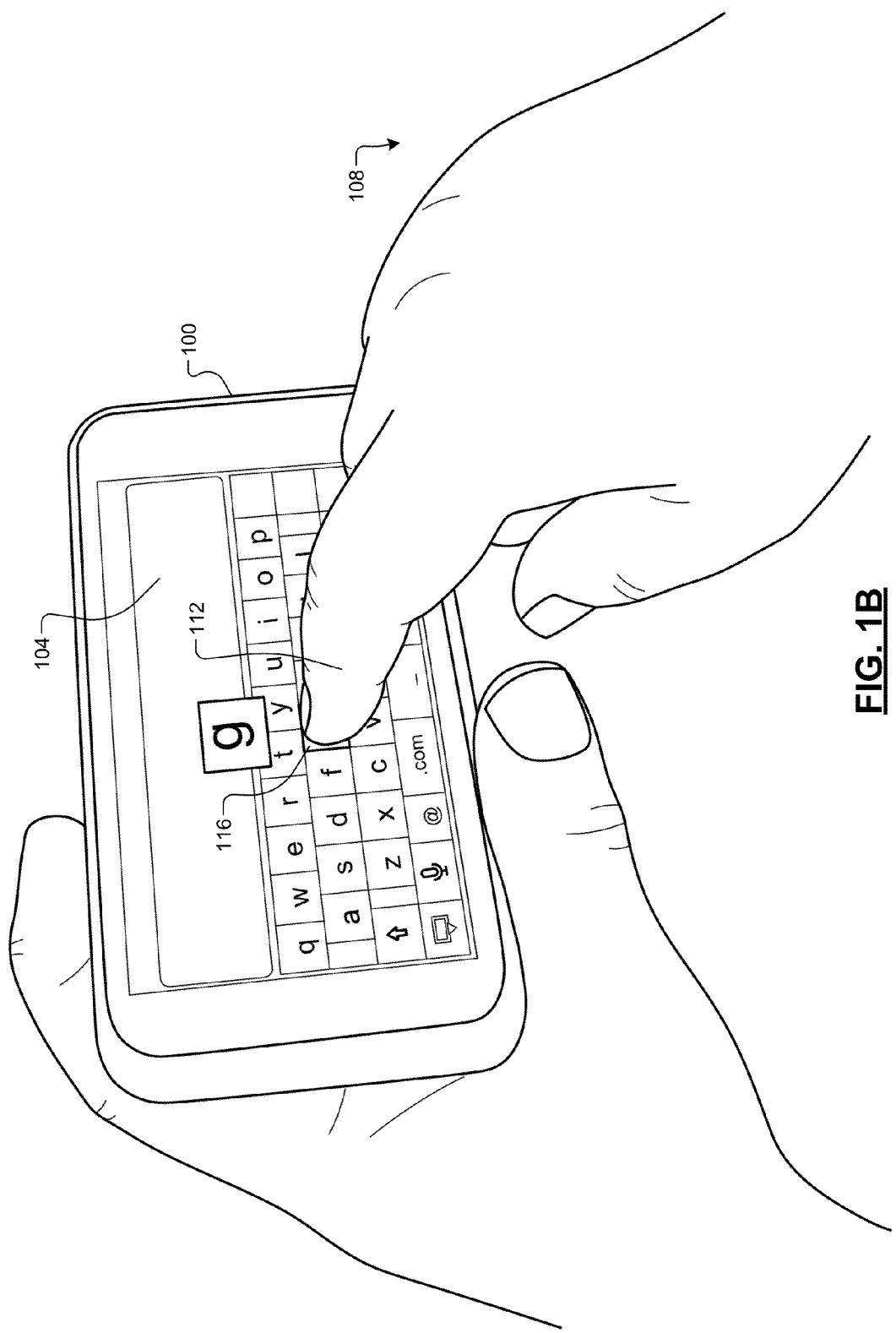
FIG. 1B illustrates an example of a spot input by a user to the touch computing device of FIG. 1.
Figure 1C:
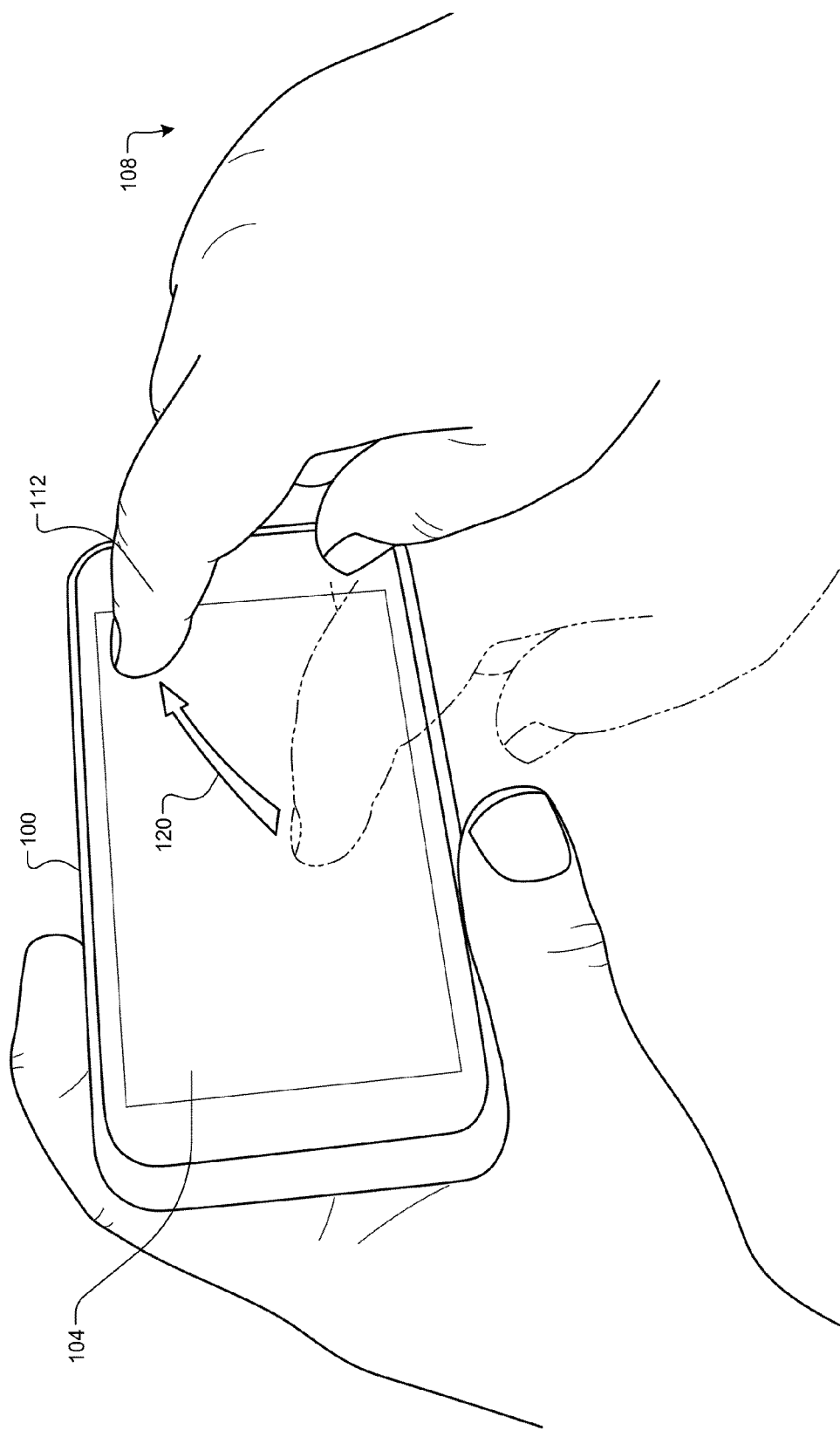
FIG. 1C illustrates an example of a slide input by the user to the touch computing device of FIG. 1.

Input techniques to the touch computing device 100 include "spot input" and "slide input." FIG. 1B illustrates spot input to the touch computing device 100. Spot input generally includes selection of a single spot 116 on the touch display 104 by the user 108. For example, as shown in FIG. 1B, the user 108 may perform spot input to select the character "g" on a displayed keyboard. FIG. 1C illustrates slide input to the touch computing device 100. Slide input generally includes a sliding motion 120 across the touch display 104 by the user 108. For example, the user 108 may perform slide input to move an object currently being displayed by the touch display 104, such as an image, a webpage, or the like.

As previously described, touch computing devices are widely available and thus may be used in many different countries throughout the world. Therefore, touch computing devices may be configured to display information to and/or receive information from the user 108 in a variety of different languages. Input method editors, or IMEs, are software applications that allow a user to input different languages to a touch computing device. Many languages are based on the Latin alphabet, e.g., English, Spanish, and French. There are many other languages, however, that are based on other characters or symbols. These languages may be characterized as syllabogram-based and logogram-based languages.

One widely used logogram-based language is Chinese. Chinese script includes thousands of unique characters. Pinyin is the official English alphabet-based transliteration of Chinese. Transliteration refers to the process of converting one script to another, e.g., English to Chinese. In other words, Pinyin refers to a system for English alphabet-based phonetic representations of Chinese characters. For example only, "zai jian" is the Pinyin representation of "再 见" or "在 建", which means "goodbye" and "under construction" in English, respectively. Therefore, one IME for touch computing devices may be a Pinyin-based IME for providing input of Chinese characters for text messaging, e-mailing, and the like.

The pronunciation of most Chinese characters can be expressed in two parts: a consonant and a vowel. The consonants for Chinese include 20 consonants of the English alphabet (except for "v") plus three additional multi-character compound consonants: ch, sh, and zh (23 total). A list of the various Chinese (Pinyin) consonants is provided below:

b, c, ch, d, f, g, h, j, k, l, m, n, p, q, r, s, sh, t w, x, y, z, and zh.

The vowels for Chinese include, in addition to the five vowels of the English alphabet, "ü" (which is input as "v") and 27 other multi-character compound vowels (33 total), e.g., ang, en, uang. Tables of the various Chinese (Pinyin) vowels are shown below:

| a | e | i | o | u | ü (input by typing v) |
|---|---|---|---|---|---|
| ai | ei | ia | ong | ua | (üan, üe, |
| an | en | ian | ou | uai | and ün can |
| ang | eng | iang | | uan | be combined |
| ao | er | iao | | uang | with uan, ue, |
| | | ie | | ue | and un) |
| | | in | | ui | |
| | | ing | | un | |
| | | iong | | uo | |
| | | iu | | | |
| 5 total | 5 total | 10 total | 3 total | 9 total | 1 total |

The possible combinations of consonants and vowels for Chinese are greater than 400. As can be appreciated, having to input individual English alphabet-based characters to input each Chinese character, e.g., the multi-character compound vowel "uang", can be time consuming. For example only, one of the longest Pinyin representations is "shuang", which includes the consonant "sh" followed by the multi-character compound vowel "uang" and thus requires six different English alphabet-based characters. In sum, traditional Pinyin-based IMEs may require more user time and effort than desired.

Accordingly, techniques are presented for slide input of a multi-character compound consonant or vowel for transliteration to another language. While the techniques described in detail herein are generally directed to English (Pinyin) input and transliteration to Chinese, the techniques may also be applied to other languages such as, for example only, Japanese or Korean. The techniques presented provide for faster and easier input of multi-character compound consonants and vowels to a touch computing device. Using the techniques presented for English (Pinyin) input and transliteration to Chinese, most Chinese multi-character compound consonants and vowels may be input using two spot inputs ("clicks") or less, e.g., a consonant plus a vowel, notwithstanding the potential slide input after one or both of the various clicks.

Figure 2:
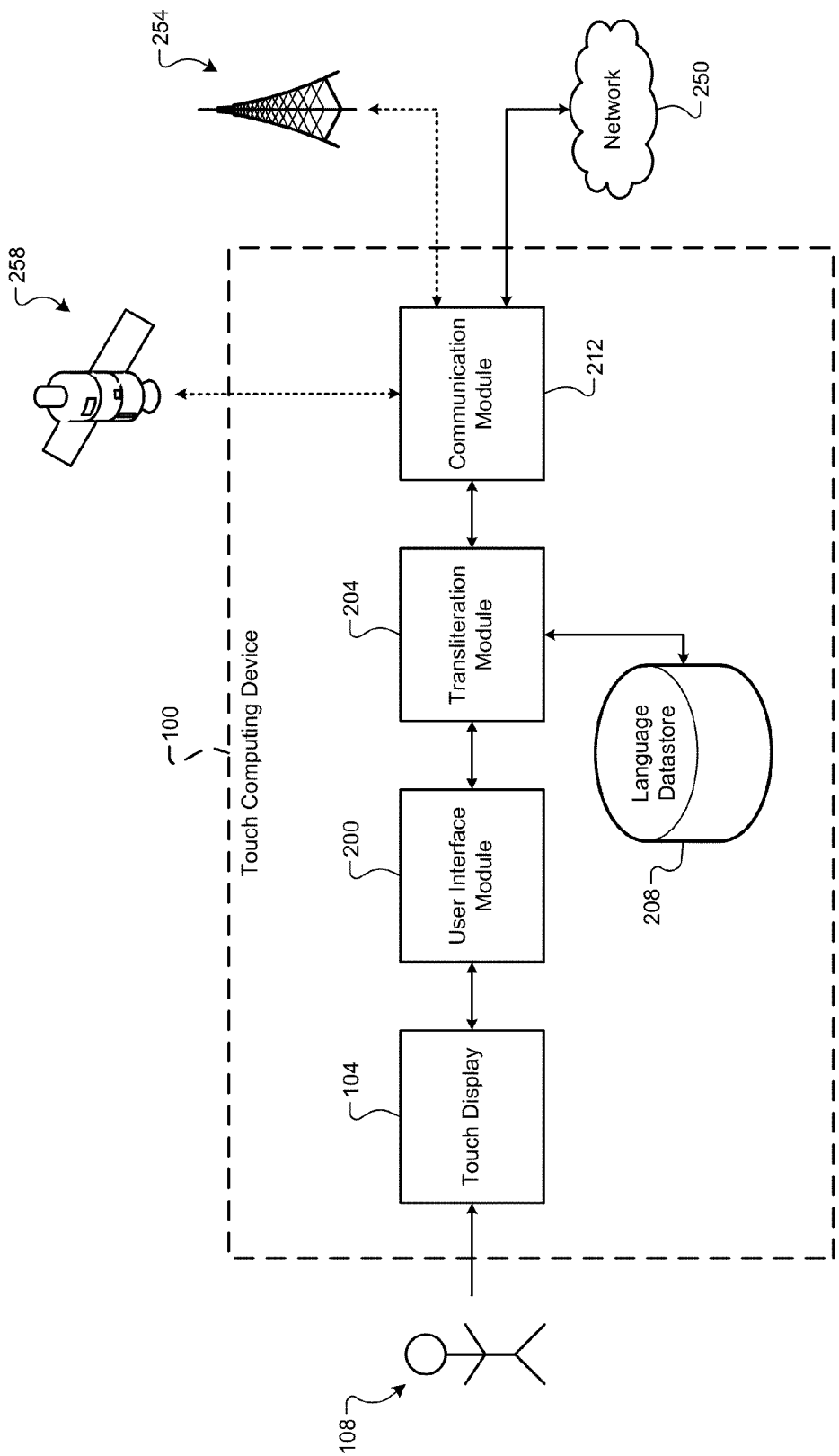
FIG. 2 is a functional block diagram of an example of the touch computing device of FIGS. 1A-1C according to some implementations of the present disclosure.

Referring now to FIG. 2, a functional block diagram of the touch computing device 100 is illustrated. As previously described, the touch computing device 100 includes the touch display 104, such as a capacitive sensing display. The touch display 104 displays information to the user 108 and/or receives information input by the user 108. The touch computing device 100, however, can further include a user interface module 200, a transliteration module 204, a language datastore 208, and a communication module 212. It should be appreciated that the touch computing device 100 may include additional computing components such as memory and the like.

The user interface module 200 controls communication with the user 108 via the touch display 104 of the touch computing device 100. The user interface module 200 may provide the user 108 with various different character input configurations via the touch display 104 of the touch computing device 100. For example, the user interface module 200 may provide the user 108 with a form of the standard QWERTY keyboard via the touch display 104 of the touch computing device 100. Alternatively, for example, the user interface module 200 may provide the user 108 with a standard 12-key configuration, also known as a telephone layout configuration. The user interface module 200 may also receive input from the user 108, e.g., via the provided character input configuration.

The transliteration module 204 receives the input from the user 108 as interpreted by the user interface module 200. The user interface module 200 and the transliteration module 204 can collectively execute various IMEs, e.g., an English (Pinyin) to Chinese IME, thereby enabling the user 108 to input characters in different languages. The transliteration module 204, therefore, may also convert the input received from the user 108 to a desired language, e.g., Chinese. For example, the transliteration module 204 may use the language datastore 208 when transliterating the user input to the desired language (described in detail later). The transliteration module 204 can communicate with the user interface module 200 in order for the user interface module 200 to provide the various character input configurations to the user.

The communication module 208 controls communication between the touch computing device 100 and other devices. For example only, the communication module 208 may provide for communication between the touch computing device 100 and other users associated with the user 108 via the Internet. The touch computing device 100 may communicate via: a computing network 250, a mobile telephone network 254, and/or a satellite network 258. Other communication mediums may also be implemented. For example, the communication module 208 may configured for both wired and wireless network connections, e.g., radio frequency (RF) communication.

As previously mentioned, the user interface module 200 can provide various character input configurations ("character layouts") to the user 108 via the touch display 104 of the touch computing device 100. For example, the character layouts may include a standard QWERTY keyboard, a standard 12-key telephone layout configuration, and the like. The user interface module 200 may also provide alternative character layouts according to the present disclosure for purposes of inputting multi-character compound consonants and vowels (described and shown in more detail later). For example, the user interface module 200 may first provide the user 108 with a standard QWERTY keyboard having English characters and, after a spot input by the user of a selected character, the user interface module 200 may provide a second configuration of English characters corresponding to possible multi-character compound consonants and vowels beginning with the selected character.

The user interface module 200 can also determine a desired input by the user 108. More specifically, the user interface module 200 can determine a string of characters input by the user 108 based on both spot input by the user 108 and slide input by the user 108. The spot input by the user 108 indicates a first selected character from a first character layout provided to the user 108. The slide input by the user 108 is from the first selected character to a second selected character from a second character layout provided to the user 108. In addition, depending on the character layout provided to the user 108 and a path of the slide input by the user 108, the string of characters may further include characters of the second character layout along the path of the slide input between the first and second selected characters.

As previously mentioned, the transliteration module 204 communicates with the language datastore 208 in order to convert the input received via the user interface module 200. Conversion from the string of English characters (Pinyin) to a Chinese character (or a list of Chinese characters) may also be referred to as transliteration. The transliteration module 204 may convert the input from the user 108, e.g., the string of characters, to a desired language. For example, the desired language may be set by the user 108 and/or may be a parameter of an IME that is currently being used. As previously described, the string of characters may represent a transliteration of a desired language, e.g., English characters (Pinyin) and Chinese being the desired language. The transliteration module 204 may use data stored in the language datastore 208 to perform the transliteration. After transliteration is complete, the transliteration module 204 may then provide the one or more transliterated characters, e.g., Chinese characters, to the user interface module 200. The user interface module 200 can then display the one or more transliterated characters to the user 108 via the touch display 104 of the touch computing device 100.

The language datastore 208 stores data corresponding to various different languages such as, for example only, English, Chinese, Spanish, French, Japanese, and Korean. The stored data may include lexicons for the various languages, rules for the various languages, rules for converting between the various languages, and the like. For example, the language datastore 208 may be memory, e.g., non-volatile memory, located within the touch computing device 100. Additionally or alternatively, all or part of the language datastore 208 may be located remotely, e.g., in the cloud, and thus may be accessed via the communication module 212. In addition, the communication module 212 may provide for periodic updating of all or part of the stored data that is stored locally, e.g., in the language datastore 208.

Referring now to FIGS. 3A-3E, examples of various character layouts for slide input of a multi-character compound vowel for transliteration to a Chinese character are shown. Each of these character layouts may be displayed to and interacted with by the user 108 via the touch display 104 of the touch computing device 100. While specific character layouts are shown for inputting each simple or multi-character compound vowel via a spot input or a spot input followed by a slide input, other character layouts may be used. For example, the character layouts may be optimized based on statistics of vowel appearances throughout the Chinese/Pinyin lexicon. In other words, slide input paths corresponding to the most frequently used vowels may be the shortest paths. Additionally or alternatively, for example, the configurations may be optimized based on statistics of users 108, e.g., optimized for right-handed or left-handed users.

Figure 3A:
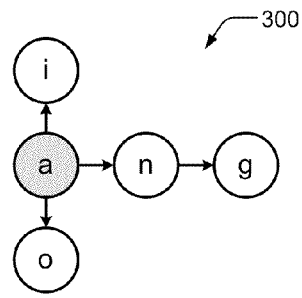
FIGS. 3A-3H illustrate examples of various character input configurations for slide input of multi-character compound vowels and consonants for transliteration to a Chinese character according to some implementations of the present disclosure.

Referring now to FIG. 3A, an example character layout 300 for slide input of vowels beginning with the English alphabet letter a is shown. As previously described, the possible vowels beginning with the letter a in Chinese include the simple vowel a in addition to the multi-character compound vowels ai, an, ang, and ao. The user 108 may input the simple vowel a via a spot input at the letter a. The letters i, n, and o are located above, to the right of, and below the letter a, respectively. The user 108 may input the multi-character compound vowels ai, an, or ao via a spot input at the letter a followed by a slide input up, right, or down, respectively. The letter g is located to the right of the letter n because of the multi-character compound vowel ang (but the lack of a multi-character compound vowel "ag"). The user 108 may input the multi-character compound vowel ang via a spot input at the letter a followed by a slide input to the right, the slide input being longer or further than the right slide input for the letter n.

Figure 3B:
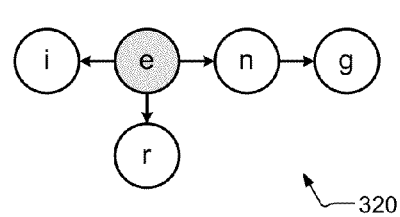

Referring now to FIG. 3B, an example character layout 320 for slide input of vowels beginning with the English alphabet letter e is shown. As previously described, the possible vowels beginning with the letter e in Chinese include the simple vowel e in addition to the multi-character compound vowels ei, en, eng, and er. The user 108 may input the simple vowel e via a spot input at the letter e. The letters i, n, and r are located to the left of, to the right of, and below the letter e, respectively. The user 108 may input the multi-character compound vowels ei, en, or er via a spot input at the letter e followed by a slide input left, right, or down, respectively. The letter g is located to the right of the letter n because of the multi-character compound vowel eng (but the lack of a multi-character compound vowel "eg"). The user 108 may input the multi-character compound vowel eng via a spot input at the letter e followed by a slide input to the right, the slide input being longer or further than the right slide input for the letter n.

Figure 3C:
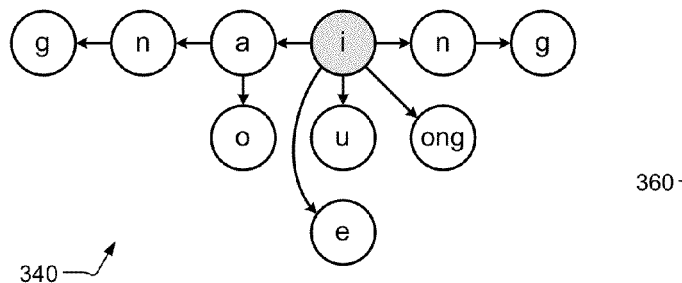

Referring now to FIG. 3C, an example character layout 340 for slide input of vowels beginning with the English alphabet letter i is shown. As previously described, the possible vowels beginning with the letter i in Chinese include the simple vowel i in addition to the multi-character compound vowels ia, ian, iang, iao, ie, in, ing, long, and iu. The user 108 may input the simple vowel i via a spot input at the letter i. The letters a, u, and a first letter n are located to the left of, below, and to the right of the letter i, respectively. The user 108 may input the multi-character compound vowels ia, iu, or in via a spot input at the letter i followed by a slide input left, down, or right, respectively.

A second letter n is located left of the letter a. A letter o is located below the letter a. The user 108 may input the multi-character compound vowels ian or iao via a spot input at the letter i followed by a slide input left (longer or further than the left slide input for the letter a) or a slide input left and then down, respectively. For example only, the multi-character compound vowel iao (and/or the multi-character compound vowel long, described in detail below) could be input by sliding from the letter i diagonally down and to the left. A first letter g is located left of the second letter n. The user 108 may input the multi-character compound vowel iang via spot input at the letter i followed by a slide input left, the slide input being longer or further than the left slide input for the second letter n.

A second letter g is located right of the first letter n. Letters ong are located below the first letter n. The user 108 may input the multi-character compound vowels ing or long via a spot input at the letter i followed by a slide input right (longer or further than the right slide input for the first letter n) or a slide input diagonally down and to the right, respectively. For example only, the letters ong may be located at this diagonal location because the multi-character compound vowel long is used less frequently than the other vowels beginning with the letter i. Additionally or alternatively, for example only, the letters ong may be located at this diagonal direction to keep a consistent layout amount ang, eng, and ing.

Lastly, the letter e is located below the letter u. The user 108 may input the multi-character compound vowel ie via a spot input at the letter i followed by a slide input down, the slide input being longer or further than the down slide motion for the letter u. For example, the slide input path of the user 108 may curve around the letter u. In some cases, the letter u, located along the slide input path, could be discarded because the multi-character compound vowel "iue" does not exist. For example only, the letter e may be located far away from the letter i because the multi-character compound vowel ie is used less frequently than the other vowels beginning with the letter i. Additionally or alternatively, for example only, another layout could position the letter e directly above the letter i.

Figure 3D:
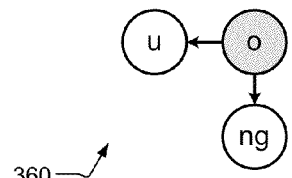

Referring now to FIG. 3D, an example character layout 360 for slide input of vowels beginning with the English alphabet letter o is shown. As previously described, the possible vowels beginning with the letter o in Chinese include the simple vowel o in addition to the multi-character compound vowels ou and ong. The user 108 may input the simple vowel o via a spot input at the letter o. The letters u and ng are located to the left of and below the letter o, respectively. The user 108 may input the multi-character compound vowels ou or ong via a spot input at the letter o followed by a slide input left or down, respectively.

Figure 3E:
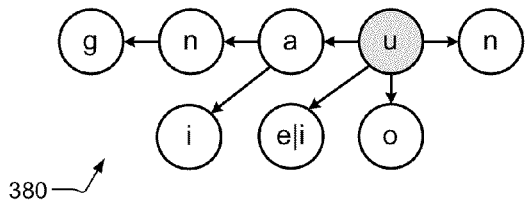

Referring now to FIG. 3E, an example character layout 380 for slide input of vowels beginning with the English alphabet letter u is shown. As previously described, the possible vowels beginning with the letter u include the simple vowel u in addition to the multi-character compound vowels ua, uai, uan, uang, ue, ui, un, and uo. The user 108 may input the simple vowel u via a spot input at the letter u. The letters a, o, and a first letter n are located to the left of, below, and to the right of the letter u, respectively. The user 108 may input the multi-character compound vowels ua, uo, or un via a spot input at the letter i followed by a slide input left, down, or right, respectively.

A second letter n is located left of the letter a. The user 108 may input the multi-character compound vowel uan via a spot input at the letter u followed by a slide input left, the slide input being longer or further than the left slide input for the letter a. A letter e/i is located below the letter a. The user 108 may input the multi-character compound vowels ue or ui via a spot input at the letter u followed by a slide input diagonally left and down. The letters e and i share the same location because there are no overlapping pronunciations of ui and ue, e.g., jue, lue, nue, que, xue, yue; chui, cui, dui, gui, hui, kui, rui, shui, sui, ui, zhui, zui.

The letter g is located left of the second letter n. The user 108 may input the multi-character compound vowel uang via spot input at the letter u followed by a slide input left, the slide input being longer or further than the left slide input for the second letter n. Lastly, the letter i is located below the letter second letter n. The user 108 may input the multi-character compound vowel uai via a spot input at the letter u followed by a slide input left, and then diagonally down and to the left. In addition, the second letter n, located along the slide input path, may be discarded because the multi-character compound vowel "uani" does not exist. Alternatively, the user 108 may input the multi-character compound vowel uai via a spot input at the letter u followed by a slide input diagonally down and to the left, the slide input being further than the diagonally down and left input for the letter e/i. For example only, the letter i may be located far away from the letter u because the multi-character compound vowel uai is used less frequently than the other vowels beginning with the letter u.

Figure 3F:
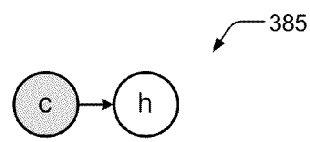
Figure 3G:
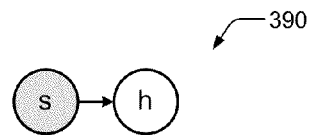
Figure 3H:
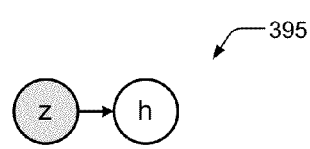

Referring now to FIGS. 3F-3H, example character layouts 385, 390, and 395 for slide input of consonants beginning with the English alphabet letters c, s, and z are shown, respectively.

Referring now to FIG. 3F, the example character layout 385 for slide input of consonants beginning with the English alphabet letter c is shown. As previously described, the possible consonants beginning with the letter c include the simple consonant c in addition to the multi-character compound consonant ch. The user 108 may input the simple consonant c via a spot input at the letter c. The letter h is located to the right of the letter c. The user 108 may input the multi-character compound consonant ch via a spot input at the letter c followed by a slide input right.

Referring now to FIG. 3G, the example character layout 390 for slide input of consonants beginning with the English alphabet letter s is shown. As previously described, the possible consonants beginning with the letter s include the simple consonant s in addition to the multi-character compound consonant sh. The user 108 may input the simple consonant s via a spot input at the letter s. The letter h is located to the right of the letter s. The user 108 may input the multi-character compound consonant sh via a spot input at the letter s followed by a slide input right.

Referring now to FIG. 3H, the example character layout 395 for slide input of consonants beginning with the English alphabet letter z is shown. As previously described, the possible consonants beginning with the letter z include the simple consonant z in addition to the multi-character compound consonant zh. The user 108 may input the simple consonant c via a spot input at the letter z. The letter h is located to the right of the letter z. The user 108 may input the multi-character compound consonant zh via a spot input at the letter z followed by a slide input right.

Figure 4:
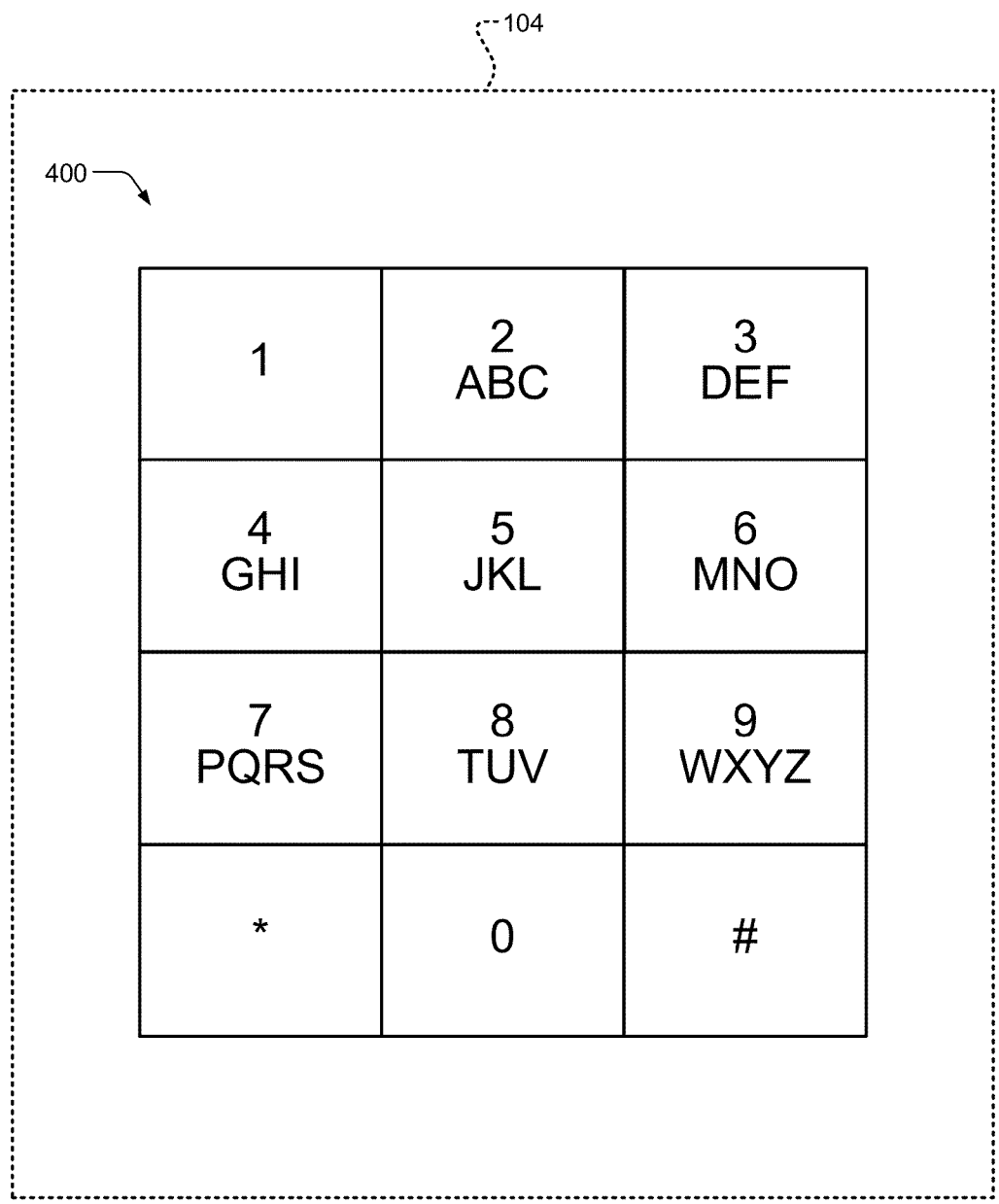
FIG. 4 illustrates an example of a standard 12-key telephone layout for slide input of a multi-character compound consonant or vowel according to some implementations of the present disclosure.

Referring now to FIG. 4, an example character layout 400 for slide input of multi-character compound consonants and vowels via a 12-key telephone layout configuration is shown. This character layout 400 may be displayed to and interacted with by the user 108 via the touch display 104 of the touch computing device 100. While the specific character layouts for vowels (shown in FIGS. 3A-3E and described above) may be implemented for the character layout 400, some of those configurations may need to be changed, e.g., the user 108 cannot slide from key 4 (vowel i) to the left in order to input multi-character compound vowel iang. Therefore, some or all of the specific character layouts may be reconfigured for this character layout 400, which may include optimization based on lexicon statistics and/or user statistics as previously described.

Figure 5:
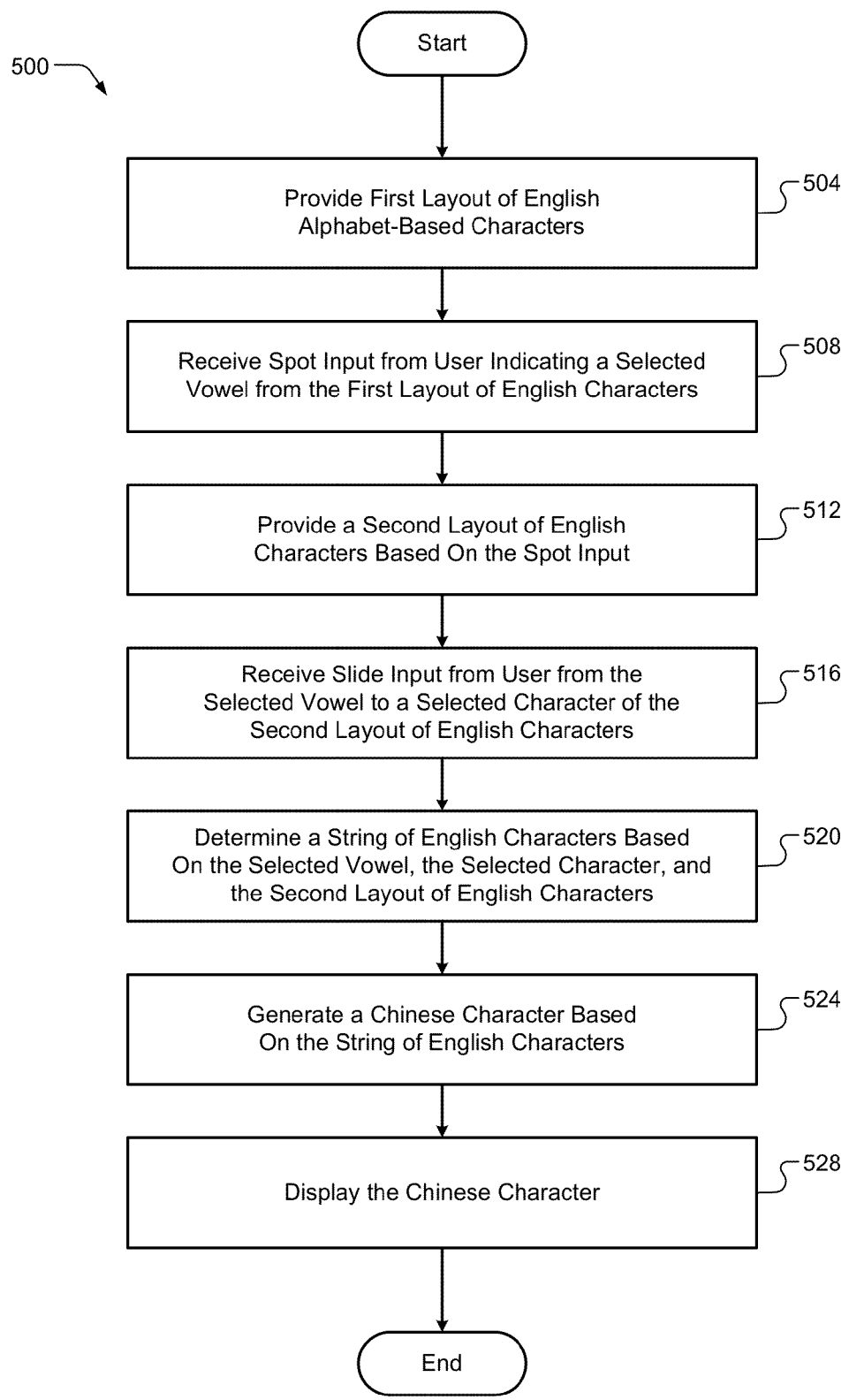
FIG. 5 is a flow diagram of an example technique for slide input of a multi-character compound vowel and translating the multi-character compound vowel to a Chinese character according to some implementations of the present disclosure.

Referring now to FIG. 5, another example of a technique 500 for slide input of multi-character compound vowels of a Chinese syllable using the touch computing device 100 begins at 504. At 504, the user interface module 200 provides, via the touch display 104 of the touch computing device 100, a first layout of English characters. At 508, the user interface module 200 receives, receiving, via the touch display 104 of the touch computing device 100, spot input from the user 108 of the touch computing device 100, the spot input indicating selection of a vowel from the first layout of English characters.

At 512, the user interface module 200 provides, via the touch display 104 of the touch computing device 100, a second layout of English characters based on the spot input, the second layout of English characters being centered about the selected vowel and including a plurality of characters based on and including the selected vowel, the second layout of English characters being different than the first layout of English characters. At 516, the user interface module 200 receives, via the touch display 104 of the touch computing device 100, slide input from the user 108 from the selected vowel to a selected character of the second layout of English characters.

At 520, the user interface module 200 determines, at the touch computing device 100, a string of English characters based on the selected vowel, the selected character, and the second layout of English characters, the string of English characters selectively including one or more other English characters of the second layout of English characters associated along a path of the slide input, the string of characters representing a vowel of a Chinese character. At 524, the transliteration module 204 generates, at the touch computing device 100, a Chinese character based on the string of characters. At 528, the user interface module 200 displays, via the touch display 104 of the touch computing device 100, the Chinese character. The technique 500 may then end or return to 504 for one or more additional cycles.

Figure 6:
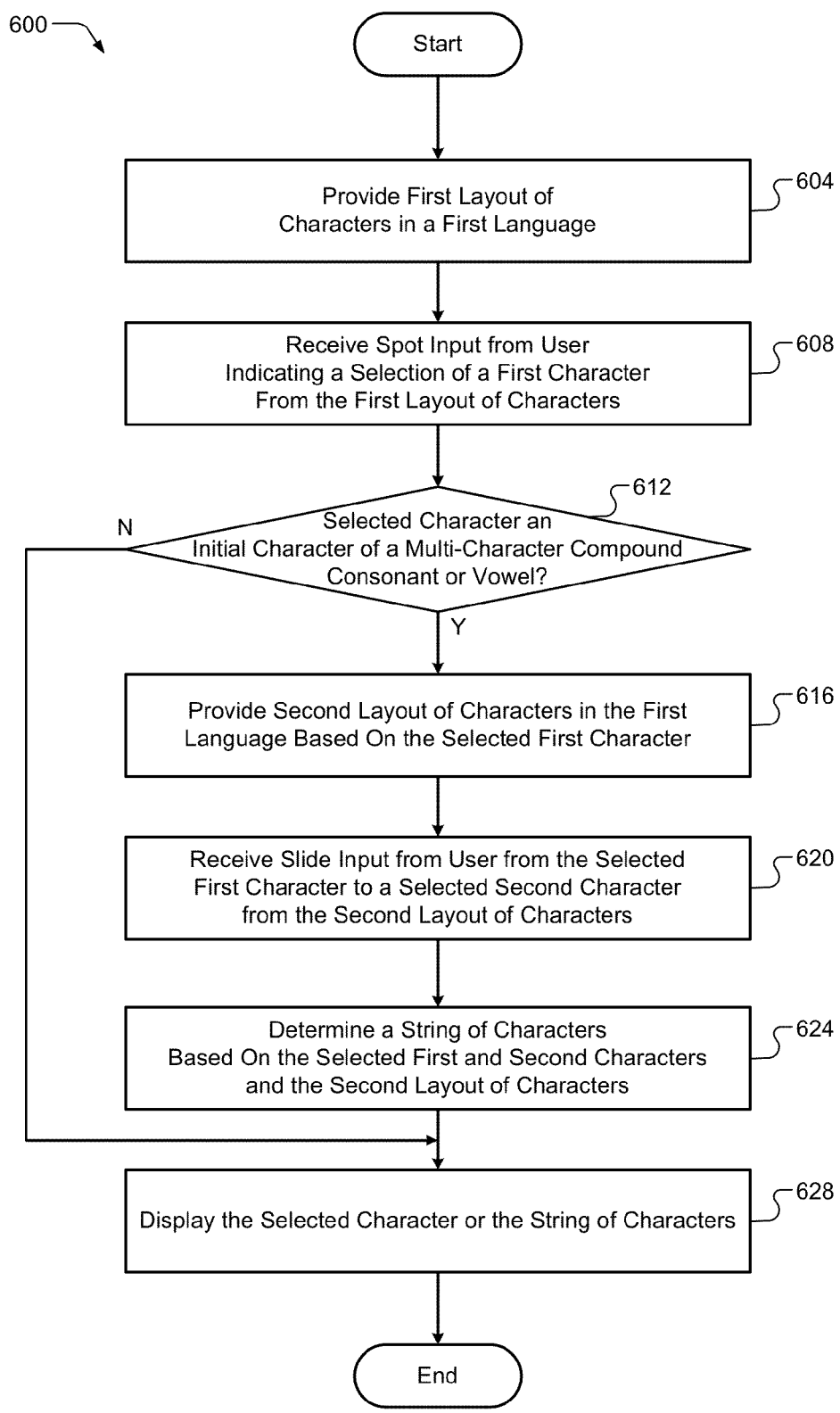
FIG. 6 is a flow diagram of another example technique for slide input of a multi-character compound consonant or vowel for transliteration to another language according to some implementations of the present disclosure.

Referring now to FIG. 6, an example technique 600 for slide input of a multi-character compound consonant or vowel for transliteration to another language using the touch computing device 100 begins at 604. At 604, the user interface module 200 provides, via the touch display 104 of the touch computing device 100, a first layout of characters in a first language. At 608, the user interface module 200 receives, via the touch display 104 of the touch computing device 100, spot input from the user 108, the spot input indicating a selection of a first character from the first layout of characters. At 612, the user interface module 200 determines, at the touch computing device 100, whether the selected character is an initial character of a multi-character compound consonant or vowel, e.g., a, c, e, i, o, s, u, or z. If true, the technique 600 can proceed to 616. If false, the technique 600 can proceed to 628.

At 616, the user interface module 200 provides, via the touch display 104 of the touch computing device 100, a second layout of characters in the first language, the second layout of characters being based on the selected first character, the second layout of characters being different than the first layout of characters. At 620, the user interface module 200 receives, via the touch display 104 of the touch computing device 100, slide input from the user 108 from the selected first character to a selected second character from the second layout of characters. At 624, the user interface module 200 determines, at the touch computing device 100, a string of characters based on the first and second selected characters and the second layout of characters, the string of characters representing a syllable in a second language. At 628, the user interface module 200 displays, via the touch display 104 of the touch computing device 100, the selected character or the string of characters (depending on the decision at 612). The technique 600 may then end or return to 604 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   providing, via a touch display of a touch computing device, a first layout of English characters;
   receiving, via the touch display of the touch computing device, spot input from a user of the touch computing device, the spot input indicating selection of a vowel from the first layout of English characters;
   providing, via the touch display of the touch computing device, a second layout of English characters based on the spot input, the second layout of English characters being centered about the selected vowel and including a plurality of characters based on and including the selected vowel, the second layout of English characters being different than the first layout of English characters, the second layout of English characters being configured such that the user can input a remainder of all possible multi-character compound vowels beginning with the selected vowel using a single slide input;
   receiving, via the touch display of the touch computing device, slide input from the user from the selected vowel to a selected character of the second layout of English characters;
   determining, at the touch computing device, a string of English characters based on the selected vowel, the selected character, and the second layout of English characters, the string of English characters including one or more other English characters of the second layout of English characters along a path of the slide input, the string of English characters representing a vowel of a Chinese character;
   generating, at the touch computing device, a Chinese character based on the string of characters; and
   displaying, via the touch display of the touch computing device, the Chinese character.

2. A computer-implemented method, comprising:
   providing, via a touch display of a touch computing device, a first layout of characters in a first language;
   receiving, via the touch display of the touch computing device, spot input from a user, the spot input indicating a selection of a first character from the first layout of characters;
   providing, via the touch display of the touch computing device, a second layout of characters in the first language, the second layout of characters being based on the selected first character, the second layout of characters being different than the first layout of characters, the second layout of characters being configured such that the user can input a remainder of all possible multi-character compound consonants or vowels beginning with the first character using a single slide input;
   receiving, via the touch display of the touch computing device, slide input from the user from the selected first character to a selected second character from the second layout of characters;
   determining, at the touch computing device, a string of characters based on the selected first and second characters and the second layout of characters, the string of characters including one or more other characters of the second layout of characters along a path of the slide input; and
   displaying, via the touch display of the touch computing device, the string of characters.

3. The computer-implemented method of claim 2, further comprising transliterating the string of characters to a second language that is different than the first language and providing, via the touch display of the touch computing device, one or more transliterated characters to the user.

4. The computer-implemented method of claim 3, wherein the first language is English, the first and second character layouts include English alphabet-based characters, and the second language is Chinese.

5. The computer-implemented method of claim 4, wherein the selected first character is a vowel.

6. The computer-implemented method of claim 5, wherein the second layout of characters is centered about the selected first character and a plurality of characters based on and including the selected first character.

7. The computer-implemented method of claim 6, wherein the second layout of characters includes potential characters used to form a multi-character compound vowel for a Chinese syllable, the multi-character compound vowel beginning with the selected first character.

8. The computer-implemented method of claim 7, wherein the second layout of characters is based on usage statistics of characters in the Chinese language, wherein the usage statistics include usage rates of various characters in the Chinese language.

9. The computer-implemented method of claim 8, wherein the second layout of characters is optimized such that slide input paths for more frequently used Chinese characters are shorter or easier for the user to input.

10. The computer-implemented method of claim 2, wherein the first layout of characters is one of a form of a standard QWERTY keyboard configuration and a 12-key telephone layout configuration.

11. The computer-implemented method of claim 2, wherein providing the second layout of characters further includes providing the second layout of characters in a pop-up window overlaying the first layout of characters.

12. A system, comprising:
   a user interface module configured to
      provide, via a touch display of a touch computing device, a first layout of characters in a first language, and
      provide, via the touch display of the touch computing device, a second layout of characters in the first language, the second layout of characters being based on a selected first character, the second layout of characters being different than the first layout of characters, the second layout of characters being configured such that the user can input a remainder of all possible multi-character compound consonants or vowels beginning with the selected first character using a single slide input,
      receive, via the touch display of the touch computing device, spot input from a user, the spot input indicating the selected first character, the selected first character being from the first layout of characters,
      receive, via the touch display of the touch computing device, slide input from the user from the selected first character to a selected second character from the second layout of characters,
      determine, at the touch computing device, a string of characters based on the selected first and second characters and the second layout of characters, the string of characters including one or more other characters of the second layout of characters along a path of the slide input, and display, via the touch display of the touch computing device, the string of characters.

13. The system of claim 12, further comprising a transliteration module configured to transliterate the string of characters to a second language that is different than the first language and provide, via the touch display of the touch computing device, one or more transliterated characters to the user.

14. The system of claim 13, wherein the first language is English, the first and second character layouts include English alphabet-based characters, and the second language is Chinese.

15. The system of claim 14, wherein the selected first character is a vowel.

16. The system of claim 15, wherein the second layout of characters is centered about the selected first character and a plurality of characters based on and including the selected first character.

17. The system of claim 16, wherein the second layout of characters includes potential characters used to form a multi-character compound vowel for a Chinese syllable, the multi-character compound vowel beginning with the selected first character.

18. The system of claim 17, wherein the second layout of characters is based on usage statistics of characters in the Chinese language, wherein the usage statistics include usage rates of various characters in the Chinese language, and wherein the second layout of characters is optimized such that slide input paths for more frequently used Chinese characters are shorter or easier for the user to input.

19. The system of claim 12, wherein the first layout of characters is one of a form of a standard QWERTY keyboard configuration and a 12-key telephone layout configuration.

20. The system of claim 12, wherein the user interface module is further configured to provide the second layout of characters in a pop-up window overlaying the first layout of characters.

* * * * *